United States Patent [19]
Hama

[11] Patent Number: 5,159,627
[45] Date of Patent: Oct. 27, 1992

[54] ADAPTIVE RINGER FOR TELEPHONE TERMINAL

[75] Inventor: Kiyoshi Hama, Tokyo, Japan

[73] Assignee: Sadao Kitazawa, Zushi, Japan; a part interest

[21] Appl. No.: 608,776

[22] Filed: Nov. 5, 1990

[30] Foreign Application Priority Data

Nov. 6, 1989 [JP] Japan .................................. 1-287615

[51] Int. Cl.$^5$ ........................................ H04M 11/02
[52] U.S. Cl. ................................... 379/374; 379/373; 379/375
[58] Field of Search ................. 379/373, 374, 375, 372

[56] References Cited

U.S. PATENT DOCUMENTS

| | | | |
|---|---|---|---|
| 4,480,153 | 10/1984 | Festa | 379/374 |
| 4,653,087 | 3/1987 | Galich | 379/373 X |
| 4,727,572 | 2/1988 | Whitney | 379/374 |
| 4,833,709 | 5/1989 | Pasinski et al. | 379/374 |
| 4,856,055 | 8/1989 | Schwartz | 379/374 |

Primary Examiner—James L. Dwyer
Assistant Examiner—Magdy W. Shehata
Attorney, Agent, or Firm—Sughrue, Mion, Zinn, Macpeak & Seas

[57] ABSTRACT

A sound generator is actuated by a trigger signal produced from a ringing signal on a telephone line, and a telephone line switching mechanism responds to the trigger signal from the trigger signal generator to disconnect the telephone set from the telephone line during an on state of the ringing signal and connect the telephone set to the telephone line during an off state of the ringing signal. Thus, the sound generator can be used to indicate the reception of a telephone call without actuating the telephone bell, and telephone communication is thereafter possible by hooking-off the telephone receiver. The line switching mechanism is preferably of a type which causes a telephone bell to ring upon a power source failure of the sound generator by connecting the telephone line to the telephone receiver.

3 Claims, 1 Drawing Sheet

ADAPTIVE RINGER FOR TELEPHONE TERMINAL

BACKGROUND OF THE INVENTION

The present invention relates to a ringer device for a terminal unit such as a telephone set or a facsimile machine and, in particular, to an adaptive ringer device for allowing any desired ringer to be used in such terminal unit instead of the ringer originally supplied therewith.

A typical example of an adaptive ringer which can be used in conjunction with a conventional telephone set is an electric bell. Such electric bell is usually used when an indication of signal reception is required in addition to the ringing of the telephone set. The adaptive ringer is attached to a telephone, line and is actuated by a ringing signal on the line to ring in synchronism with an electric bell of the telephone set.

In the conventional adaptive ringer which has a similar construction to that of the telephone bell and is connected directly to a telephone line, the ringer and the telephone bell are actuated simultaneously. In order to prevent the ringing of the telephone bell, it is necessary to separate the telephone set from the telephone line and to connect it again to the line upon ringing of the adaptive ringer to initiate telephone communication. This procedure is troublesome. Further, there is a strong requirement for a ringer which produces not a bell sound but instead some audio sound such as a melody or voice. Such conventional adaptive ringer can not respond to such requirement.

SUMMARY OF THE INVENTION

An object of the present invention is to provide an adaptive ringer which is capable of indicating the reception of a ringing signal on a telephone line, and which allows communication by merely lifting or hooking-off the telephone receiver handset.

In order to achieve the above object, an adaptive ringer according to the present invention comprises a trigger signal generator for generating a trigger signal by rectifying a ringing signal derived from a junction between a telephone line and a telephone terminal or set, a sound generator adapted to be actuated by the trigger signal from the trigger signal generator and a telephone line switching mechanism responsive to the trigger signal from the trigger signal generator for disconnecting the telephone set from the telephone line during an on state of the ringing signal and connecting the telephone set to the telephone line during an off state of the ringing signal. The line switching mechanism is preferably of a type which causes a telephone bell to ring upon detection of an abnormality of power source of the sound generator.

In the present invention, the adaptive ringer device, which may produce a sound other than that of a bell, is provided in addition to the telephone bell and is actuated by a ringing signal on the telephone line. Thus, any desired sound can be obtained as an indication of reception, while a usual telephone communication is possible by merely hooking-off the telephone receiver.

BRIEF DESCRIPTION OF THE DRAWINGS

The above and other objects, features and advantages of the present invention will become clear from a detailed description of embodiments with reference to the accompanying drawings in which.

DETAILED DESCRIPTION OF THE PREFERRED EMBODIMENTS

Figure 1:
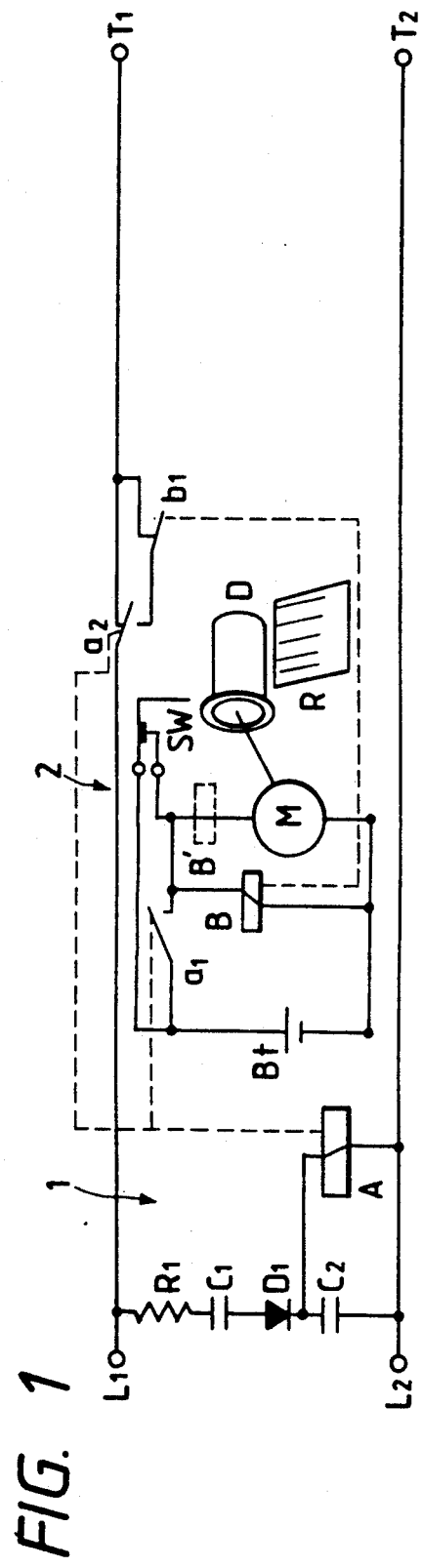
FIG. 1 shows a circuit diagram of an embodiment of an adaptive ringer according to the present invention.

In FIG. 1, an adaptive ringer according to the present invention comprises a trigger signal generator 1 and a sound generator 2. The trigger signal generator 1, for generating a trigger signal by rectifying a ringing signal on a telephone line, is connected between input terminals L1 and L2 which are adapted to be connected to the telephone line, and between terminals T1 and T2 which are adapted to be connected to a terminal device such as a telephone set, respectively. The trigger signal generator 1 comprises a series connection of a current limiting resister R1, a d.c. current blocking capacitor C1, a rectifying diode D1, and a smoothing capacitor C2 and a relay A having a coil connected in parallel with the capacitor C2. The relay A controls a normally open switch contact a1 and a normally closed contact a2 making a connection between the terminals L1 and T1. The rectifying diode D1 may be advantageously replaced by a bridge type rectifier. When the relay A is an a.c. type, the rectifying diode D1 and the smoothing capacitor C2 may be removed.

In this embodiment, the sound generator 2 is in the form of motor-driven music box. The sound generator 2 comprises a drum D having pins implanted on an outer surface thereof, a reed plate R, a motor M for driving the drum D, a normally open switch SW whose closure is controlled by a cam formed on the drum D, a power source Bt and a relay B having a normally closed contact b1. The motor M is connected in parallel with the battery Bt through the normally open contact a1 of the relay A of the trigger signal generator 1. The relay B is connected in parallel with the motor M and has substantially the same operating voltage or current limit as that of the motor M. Alternatively, a relay B' which is identical in characteristics to the relay B may be connected in series with the motor M. The function of the relay B or B' is to monitor an abnormal operation of the device such as an abnormality of the power source (a dead battery), a circuit breakage or loss of contact, and to connect the terminal L1 to the terminal T1 when such abnormality occurs to thus enable the conventional ringing of the telephone.

In operation, when a ringing signal which is an intermittent signal, exists on the incoming telephone line connected to the terminals L1 and L2, an intermittent, limited current flows from the terminal L1 through the resistor R1, the capacitor C1, the diode D1 and the capacitor C2 to the terminal L2. The rectified intermittent ringing signal current is used as a trigger signal by which the relay A is actuated to intermittently close the normally open contact a1 and open the normally closed contact a2.

With the opening of the relay contact a2, the terminal T1 is disconnected from the terminal L1 and thus the telephone set ringer is not actuated. With the closure of the contact a1, the motor M is connected to the battery Bt and energized, so that the drum D is rotated to cause a melody to be produced by the reed plate R to thereby indicate an incoming telephone call. With the rotation of the drum D, the switch SW is closed by the cam associated with the drum D so that the motor M is energized continuously, for a full drum revolution, to complete the action of the music box regardless of the intermittent energization of the relay A.

A user may hook-off the telephone receiver in response to the sound from the sound generator 2. The telephone set becomes connected to the telephone line by this hooking-off during an off state of the ringing signal and the latter signal is stopped so that telephone communication is possible, since the connection between the terminals L1 and T1 is established during an off state of the ringing signal.

When the relay B or B' is not actuated due to deenergization of the motor M by some malfunction of the power source, circuit breakage or contact loss, the normally closed contact b is kept closed so that the telephone set ringer can be actuated instead of the sound generator 2.

Figure 2:
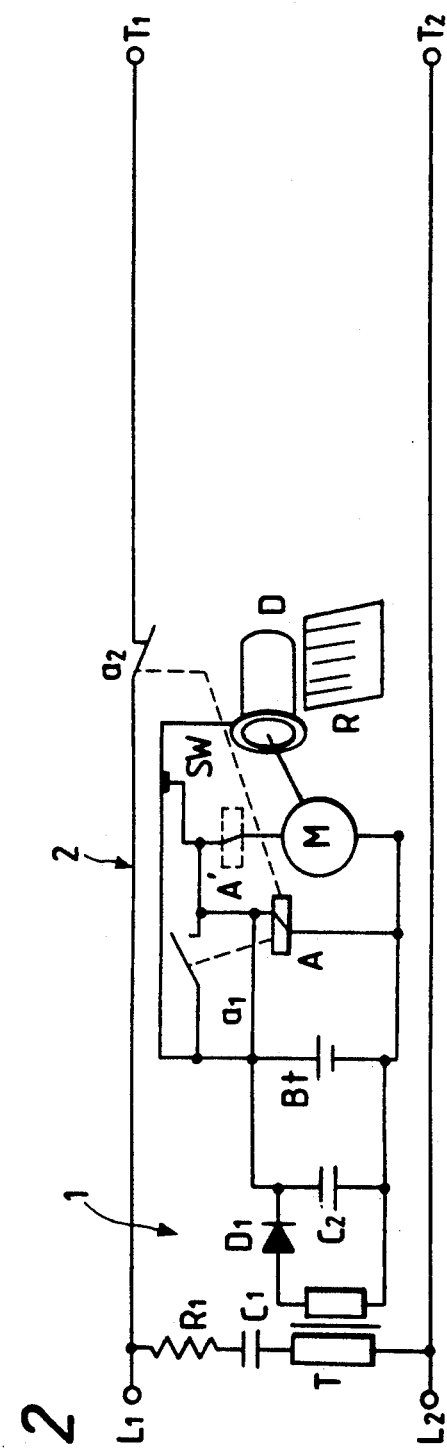
FIG. 2 shows a circuit diagram of another embodiment of the present invention.

FIG. 2 shows another embodiment of the present invention in which the trigger signal generator 1 comprises a series connection of a current limiting resistor R1, an a.c. current blocking capacitor C1 and a primary coil of a transformer T. A series circuit of a rectifying diode D1 and a smoothing capacitor C2 is connected in parallel with a secondary coil of the transformer T. The smoothing capacitor C2 is connected in parallel with a battery Bt of a ringer device 2 having substantially the same construction as that of the embodiment shown in FIG. 1.

A relay A having a normally open contact a1 and a normally closed contact a2 is connected in parallel with a motor M of the sound generator 2. Alternatively, a similar relay A' may be provided in series with the motor M. The normally closed contact a2 is inserted in a connection between terminals L1 and T1.

In operation, when an incoming ringing signal flows through the primary coil of the transformer T, a suitable voltage induced in the secondary coil of the transformer is rectified by the diode D1 and used to directly drive the motor M and the relay A or A'. Upon the actuation of the relay A or A', the contact a1 is closed to supply battery power to the motor M to thereby drive the drum D and, after a switch SW is closed by a cam on the drum D, this construction operates in a similar manner to that of the device shown in FIG. 1. This embodiment also provides a failsafe function for a failure of the battery Bt.

Although a music box is employed for the sound generator 2 in these embodiments, other devices such as a siren, buzzer, bell, chime or tape or disc reproducing device may be used therefore with the same effect.

As described, according to the present invention, the sound generator is actuated by the trigger signal from the trigger signal generator and a telephone line switching mechanism responds to the trigger signal from the trigger signal generator for disconnecting the telephone set from the telephone line during an on state of the ringing signal and connecting the telephone set to the telephone line during an off state of the ringing signal. Thus, the sound generator can be used to indicate the reception of a telephone call without actuating the telephone bell, and telephone communication is thereafter possible by simply hooking-off the telephone receiver.

The line switching mechanism is preferably of a type which causes a telephone bell to ring upon detection of an abnormality of the power source of the sound generator by connecting the telephone line to the telephone receiver when the power source of the sound generator is abnormal.

What is claimed is:

1. An adaptive ringer device for a telephone receiver, comprising: a trigger signal generator (1) connected across a pair of telephone lines for generating a trigger signal by rectifying a ringing signal on the telephone lines, a sound generator (2) adapted to be actuated by said trigger signal, and a circuit switching mechanism (A, a2) responsive to said trigger signal for disconnecting a telephone receiver from said telephone lines during an on state of said ringing signal and connecting said telephone receiver to said telephone lines during an off state of said ringing signal, wherein the sound generator comprises:
a) a battery,
b) a motor adapted to be energized by the battery,
c) a first, normally open switch (a1), adapted to be closed by the trigger signal generator in response to each incoming ringing signal to connect the battery to the motor,
d) a rotary member (D) driven by the motor,
e) a second, normally open switch (SW), coupled in parallel with the first switch, for connecting the battery to the motor,
f) a cam surface defined on a periphery of the rotary member, and
g) a follower cooperable with the cam surface for closing the second switch upon the rotation of the rotary member and for maintaining the second switch closed for a full revolution of the rotary member, such that the motor remains energized for such full revolution after a cessation of a ringing signal and an attendant opening of the first switch.

2. The device claimed in claim 1, wherein said circuit switching mechanism operates to connect said telephone lines to said telephone receiver to actuate a ringer of said telephone receiver when a power source of said sound generator is abnormal.

3. The device claimed in claim 1, wherein the rotary member is a music box drum, and a musical read plate (R) is disposed in cooperation with the drum.

* * * * *